United States Patent [19]
Hettinger et al.

[11] Patent Number: 5,762,097
[45] Date of Patent: Jun. 9, 1998

[54] MODULAR VALVE FOR FLUIDS

[75] Inventors: Christoph Hettinger, Ingelfingen; Heribert Rohrbeck, Schwäbisch Hall; Helmut Kalb, Neuenstein; Jürgen Renninger, Bretzfeld, all of Germany

[73] Assignee: Bürkert Werke GmbH & Co., Ingelfingen, Germany

[21] Appl. No.: 612,833

[22] PCT Filed: Jul. 14, 1995

[86] PCT No.: PCT/EP95/02774

§ 371 Date: May 14, 1996

§ 102(e) Date: May 14, 1996

[87] PCT Pub. No.: WO96/02782

PCT Pub. Date: Feb. 1, 1996

[30] Foreign Application Priority Data

Jul. 19, 1994 [DE] Germany .......................... 44 25 540.3

[51] Int. Cl.⁶ .......................................... F16K 31/06
[52] U.S. Cl. .................. 137/270; 251/129.15; 251/129.03
[58] Field of Search .................. 251/129.15, 129.03, 251/129.2; 137/270, 269

[56] References Cited

U.S. PATENT DOCUMENTS 4,534,381  8/1985  Hozumi et al. ................ 251/129.03 X

FOREIGN PATENT DOCUMENTS

| | | |
|---|---|---|
| 1908689 | 6/1971 | Germany . |
| 2037774 | 2/1972 | Germany . |
| 2161617 | 10/1972 | Germany . |
| 2236137 | 1/1974 | Germany . |
| 3334159 | 4/1985 | Germany . |
| 4233299 | 5/1994 | Germany . |

*Primary Examiner*—Kevin Lee
*Attorney, Agent, or Firm*—Sixbey, Friedman, Leedom & Fergusn; David S. Safran

[57] ABSTRACT

A modular valve for fluids comprises a valve housing (16) having a plurality of fluid ports, a spring-loaded switching rocker (18) which is adapted to be inserted into the valve housing (16), and an electromagnetic valve drive (20). Between the valve housing (16) and the electromagnetic valve drive (20) a generally magnetically non-conductive plate (30) is inserted having locally limited magnetically conductive regions (32, 34) for the electromagnetic valve drive (20) to act through on one of two limbs of the switching rocker (18), whereas the other limb is not able to be acted upon magnetically. Valve members provided at the opposite ends of the switching rocker (18) and poles (44, 46, 48) of the electromagnetic valve drive (20) are arranged symmetrically with respect to a plane containing the rocker axis (50) and perpendicular to the intermediate plate (30). The valve housing (16), the switching rocker (18) with an associated spring loading means (66), the intermediate plate (30) and the electromagnetic valve drive (20), able to be coupled with an electrical connection part (60), are able to be alternatively mounted in two positions angularly spaced by 180° about an imaginary axis (96) perpendicular to the rocker axis (50) and in the plane of symmetry.

FIG. 2

23 Claims, 9 Drawing Sheets

MODULAR VALVE FOR FLUIDS

The invention relates to a modular valve for fluids comprising a valve housing having a plurality of fluid ports, a switching rocker which is adapted to be inserted into the valve housing and is spring-loaded into an initial position, and an electromagnetic valve drive adapted to be fitted, opposite to the switching rocker, to the valve housing, by means of which drive the switching rocker can be moved into a working position against such spring-loading, at least one fluid port opening at a valve seat, against which a valve member, provided on the switching rocker, may be applied.

In practice, dependent on applications, modifications may be required more especially at the fluid and electrical interfaces of the valve. In the case of designs so far used this generally means that more or less the entire valve must be accordingly altered. Accordingly for different applications valves are employed differing in their overall structure.

In order to produce different ways of operating of solenoid valves it is a known expedient to direct the volumetric flow into respective ducts using so-called shunting plates. In this respect the inherent type of connection on the valve is adhered to. In the ducts carrying the redirected volumetric flow there is then however a substantial flow loss. A further disadvantage is that the shunting plate leads to a larger overall size of the valve. Furthermore in conventional solenoid valves a modification in the fluid containing part is only possible by replacement of parts, by for example, fitting different spring elements. This again is something rendering necessary stockholding of a large number of different parts. Apart from the fact that such stockholding is cost-intensive, the large number of the parts always means that there is also a danger of confusion of parts with the result that a particular production process may be impeded.

One aim of the invention is to create a modular valve of the type initially mentioned, which while adhering to a generally uniform basic structure may be readily adapted, more particularly as well as regards the requirements of various different electrical and fluid porting systems.

In order to achieve this object the invention has the provision that between the valve housing and the electromagnetic valve drive a generally magnetically non-conductive plate is able to be inserted having locally limited magnetically conductive regions for the electromagnetic valve drive to act through on one of two limbs of the switching rocker, whereas the other limb is not able to be acted upon magnetically, that valve members provided at the opposite ends of the switching rocker and poles of the electromagnetic valve drive are arranged symmetrically with respect to a plane containing, in the assembled state of the valve, the axis of the rocker and perpendicular to the intermediate plate, and that the valve housing, the switching rocker with such associated spring loading means, the intermediate plate and/or the electromagnetic valve drive, able to be coupled with an electrical connection part, are able to be mounted alternatively in two positions spaced angularly by 180° about an imaginary axis which is perpendicular to the rocker axis and in the plane of symmetry.

Owing to this design a more particularly uniform valve drive may be employed for different valve designs. By the arrangement of different electrical connection parts and furthermore different valve housings for the fluid, which are respectively designed in a modular manner, the valve may be adapted to the requirements applying without difficulty. Different requirements as regards the design of the electrical connections and fluid ports may be more particularly coped with since the switching rocker with the associated spring loading means, the intermediate plate and/or electromagnetic valve drive, able to be coupled with an electrical connection part, are able to be alternatively respectively mounted in two different positions angularly spaced by 180°.

Owing to symmetrical arrangement of the magnet poles or, respectively, corresponding symmetrical design of the electromagnet, same may be mounted with an angular offset of 180° without the manner of operation of the valve being affected thereby. The electrical connection side may consequently be modified without alteration of the fluid side part, that is to say without altering the valve housing. The manner of operation of the valve may for example be changed by installing the intermediate plate and the switching rocker with its associated spring loading means in a position which is respectively turned through 180°.

The desired symmetrical design of the electromagnet may be ensured with advantage if same comprises a three limbed yoke and a coil arranged on the center limb thereof. In its assembled condition of the valve only the center yoke limb and one of the two outer yoke limbs will have a locally limited magnetically conductive region of the intermediate opposite to it. The other outer yoke limb will remain inactive.

In the case of a preferred embodiment, the switching rocker is pivotally mounted by the intermediary of elastic lugs, extending along the pivot axis thereof, on a frame part manufactured of sealing material, such frame part being able to be inserted as a housing seal between the valve housing and the intermediate plate terminating same, the valve members provided on the switching rocker being also manufactured of sealing material, said housing seal being formed integrally with the lugs and the valve members. Owing to this integration of the housing seal in the seat seal there is not only a reduction in the number of individual parts, but furthermore the fitting of the switching rocker is facilitated with the result that manufacturing costs are still further reduced. Moreover, additional damping of the switching mechanism is achieved.

The switching rocker is preferably also provided with an associated manual actuating device. Same advantageously comprises an actuating element arranged on one outer side of the valve housing and being connected, via a drive shaft extending into the interior of the valve housing perpendicularly to the axis of the pivoting of the switching rocker, with a cam shaft, which is provided with two cams extending radially in opposite directions and being associated with one of the two limbs of the switching rocker. Using this manual actuating device it is hence possible, dependent on the direction of turning, to actuate both the one as well as the other switching rocker limb. This is particularly an advantage for resetting in the case of pulsed operation of the valve. In this operational mode it is possible for example for a permanent magnet to hold the switching mechanism after manual setting. This holding force is overridden on reset owing to the action of the respective cam on the opposite side of the switching mechanism. It is furthermore an advantage that more particularly by providing installation turned through 180° of the switching rocker and of the intermediate plate the manner of operation of the valve may be altered without it being necessary to simultaneously remount the manual actuating device on the opposite side of the valve. In order to maintain the function of the manual actuating device it is sufficient for the cam shaft to be slipped onto the drive shaft with a shift through 180°. This is more especially an advantage, if the manner of operation of the valve must be set after being supplied to the user later.

In accordance with a preferred modified embodiment at least one spring receiving means on the delivery port side and at least one spring receiving means on the return port side is provided in the valve housing and the switching rocker has at least one associated return spring, able to be employed alternatively on the two connection sides, such return spring bearing, for a respective action on the switching rocker, on such respective spring receiving means, the spring receiving means provided on the different connection sides having different depths in the valve housing as seen from the housing edge adjacent to the switching rocker. In this respect the delivery port side spring receiving means is preferably deeper in the valve housing than the return flow side spring receiving means. Accordingly, given suitably selected depths of the spring receiving means it is also possible for identical return springs to be utilized for the different manners of the operation of the valve. More particularly, it is possible to ensure that the spring stroke for a power down open valve is longer than the spring stroke for a power down closed valve. In this case using identical springs for the two modes of operation may provide correspondingly different resilient forces.

The valve of the invention accordingly renders possible a plurality of different variations in installation as desired by the user without any difficulties. Owing to the modular structure in accordance with the invention and the standardization of the parts there is simple and low-cost assembly and servicing. The modular manner of construction also means that stockholding may be limited to but a few components for one size of valve. Cost-intensive customized designs are abandoned.

In the dependent claims further, advantageous embodiments of the invention are indicated.

Further features and advantages of the invention will be understood from the following description and the drawings, to which reference should be had.

Figure 1:
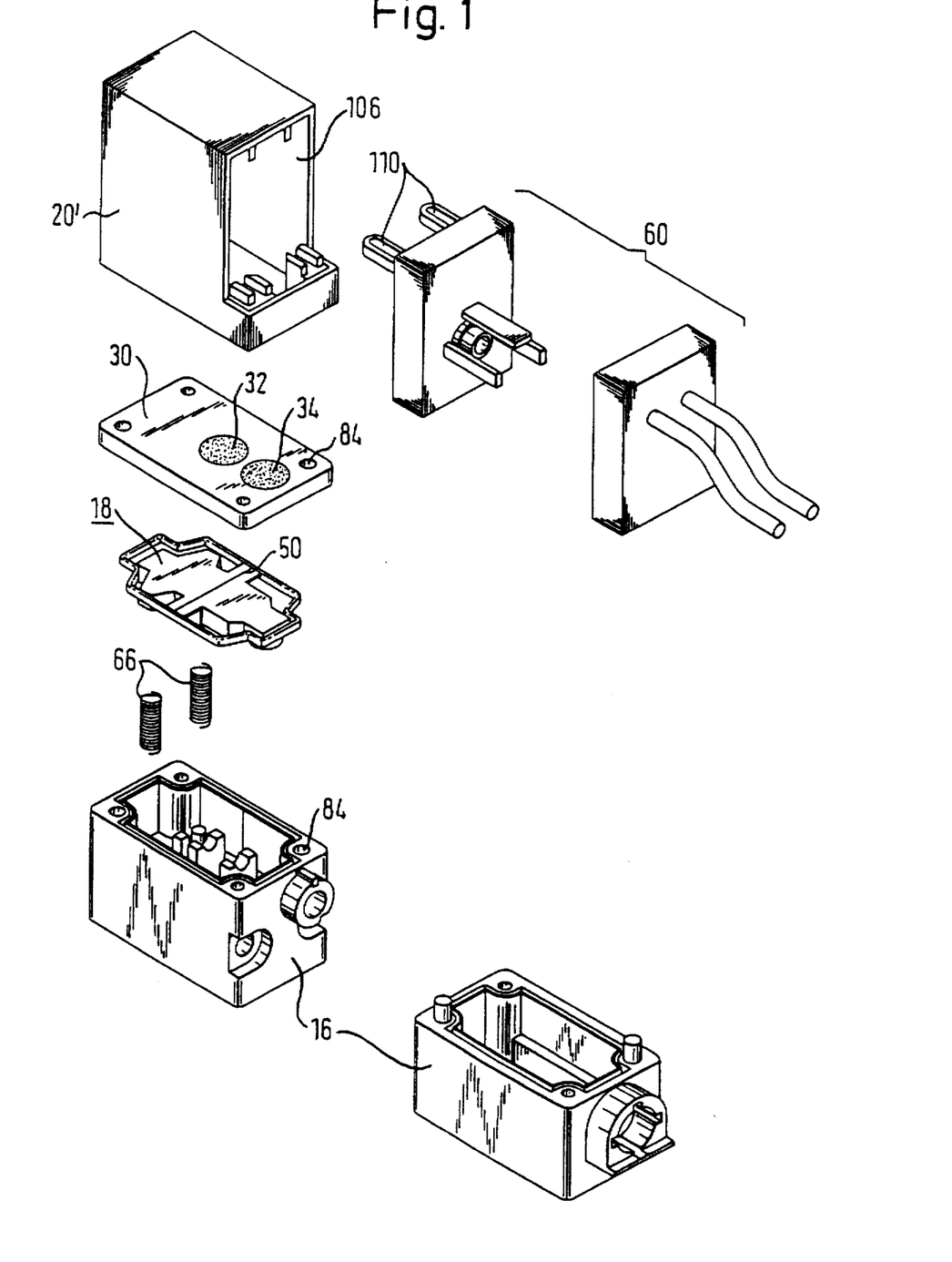
FIG. 1 is a simplified, diagrammatic representation of the modular structure of a valve, parts of the valve drive being omitted to render the figure more straightforward.
Figure 2:
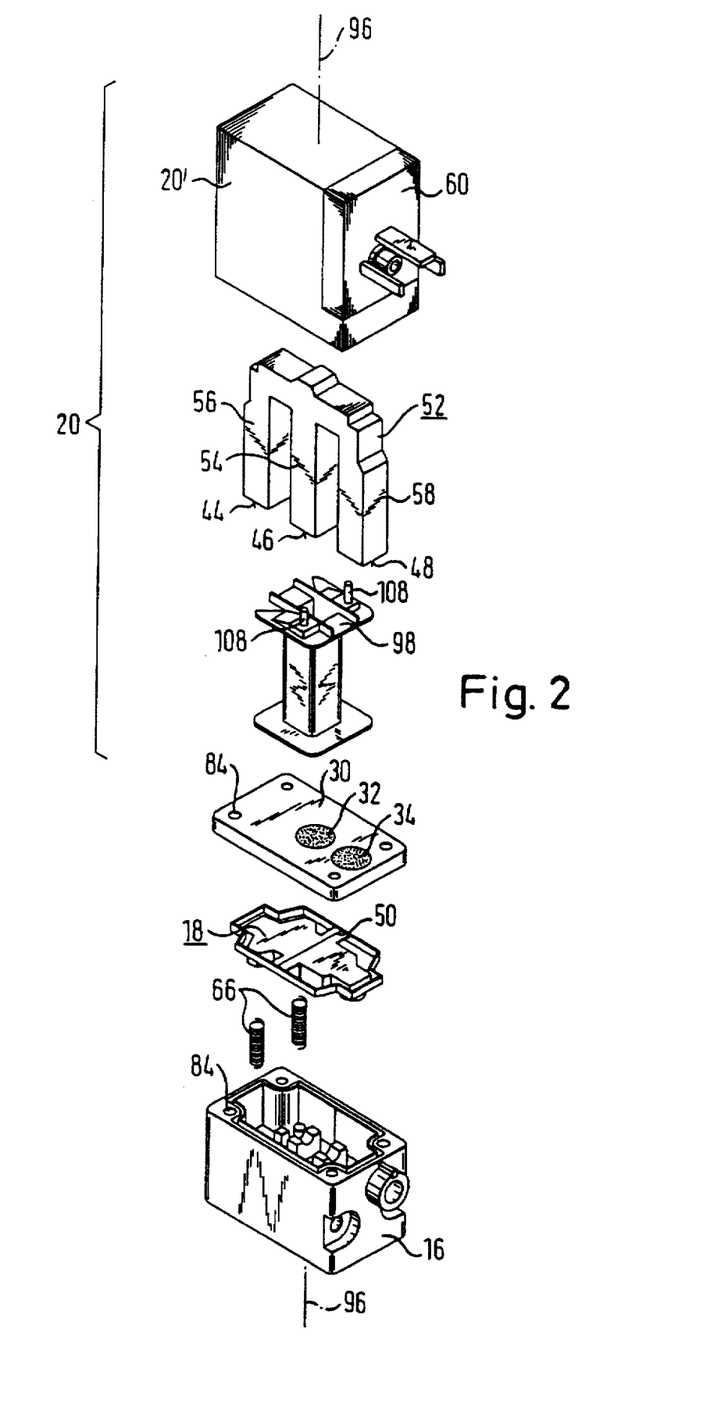
FIG. 2 is a diagrammatic exploded view similar to that of FIG. 1, the electromagnet of the valve drive being included in addition.

In FIGS. 1 and 2 the reader will see respectively different components of a modular valve for fluids in a purely diagrammatic exploded view. In accordance therewith the said modular valve comprises a valve housing 16 possessing a plurality of fluid ports, a switching rocker 18 adapted to be inserted in the valve housing 16, an electromagnetic valve drive 20 adapted to be fitted on the valve housing 16 opposite to the switching rocker 18 and having its associated housing 20' and furthermore an electrical connection part 60, adapted to be coupled with the electromagnetic valve drive 20 or, respectively, its housing 20', for powering the electromagnet.

In FIG. 1 two alternatively employed valve housings 16 are illustrated. The electrical connection part 60 able to be coupled with the electromagnetic valve drive 20 is, in the present embodiment, multi-part in design. Owing to the modular design it is possible, in accordance with a particular application, to also employ other valve housings 16 and other electrical connection parts 60, whereas the electromagnetic valve drive 20 is best designed in the form of a uniform component.

Figure 3A:
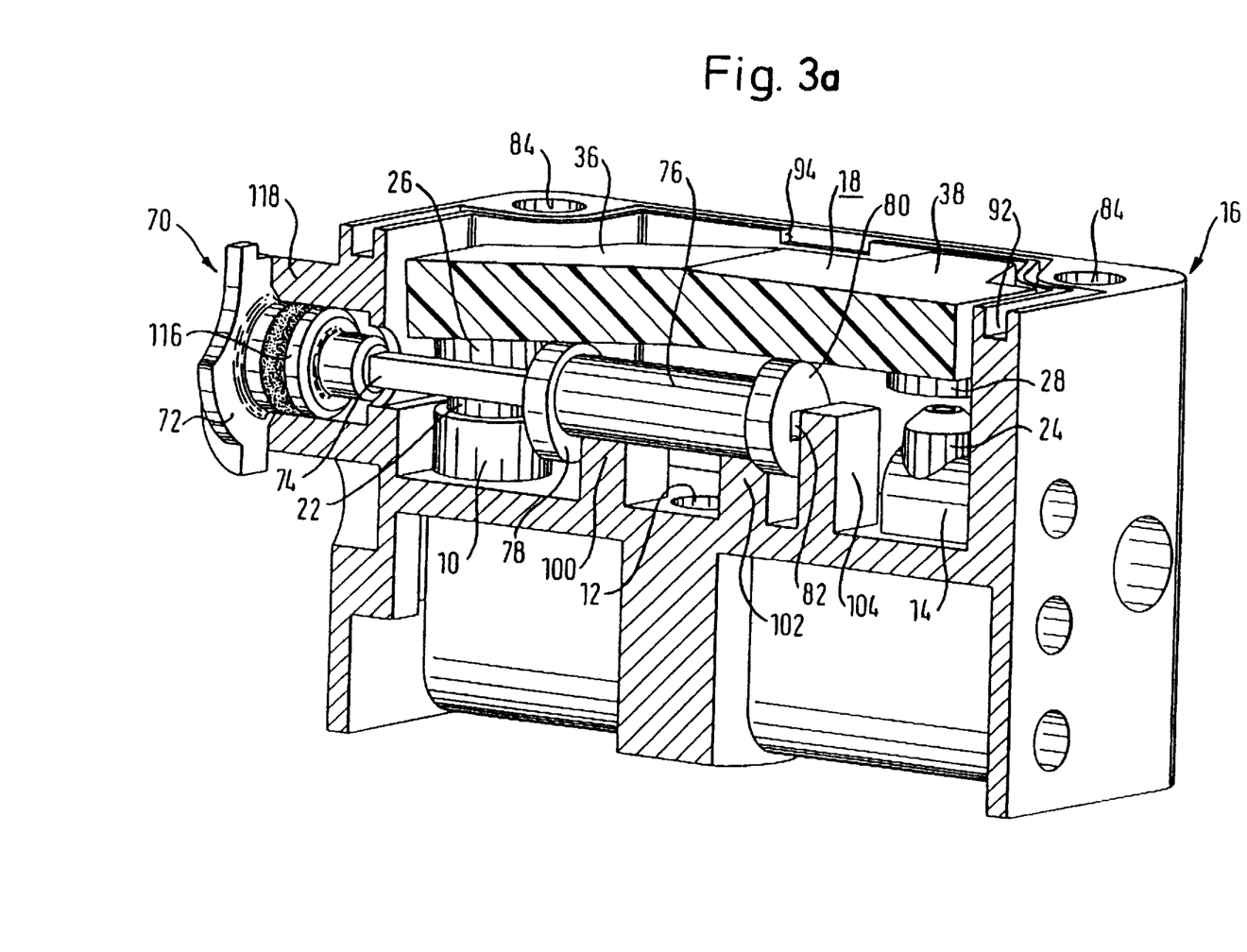
FIG. 3a is a diagrammatic perspective sectional elevation of the valve housing together with the switching rocker and with the manual actuating device installed and FIGS. 3b and 3c are illustrative partial cross-sectional views illustrating the relationship of the electromagnetic valve drive with respect to the valve housing.
Figure 3B:
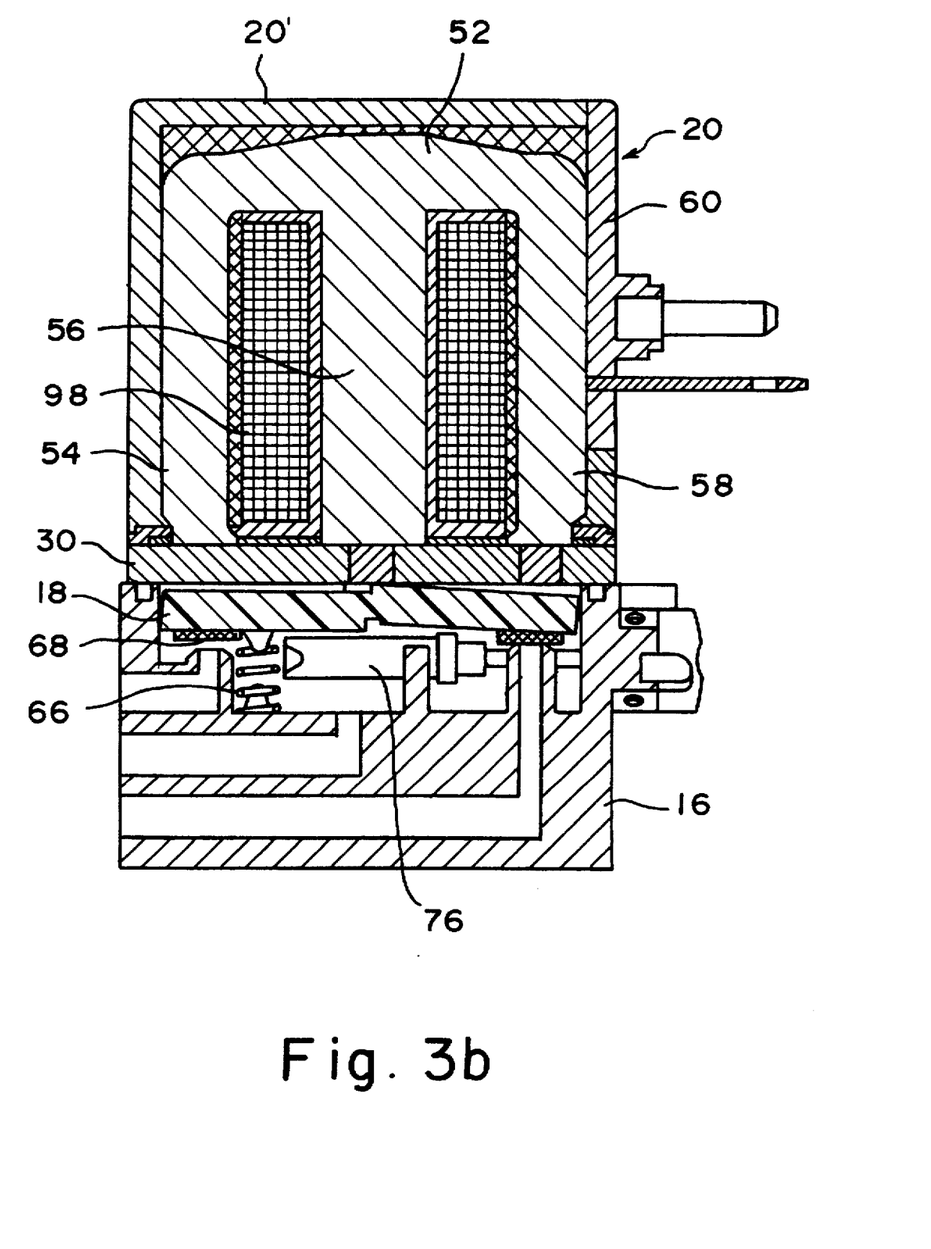
Figure 3C:
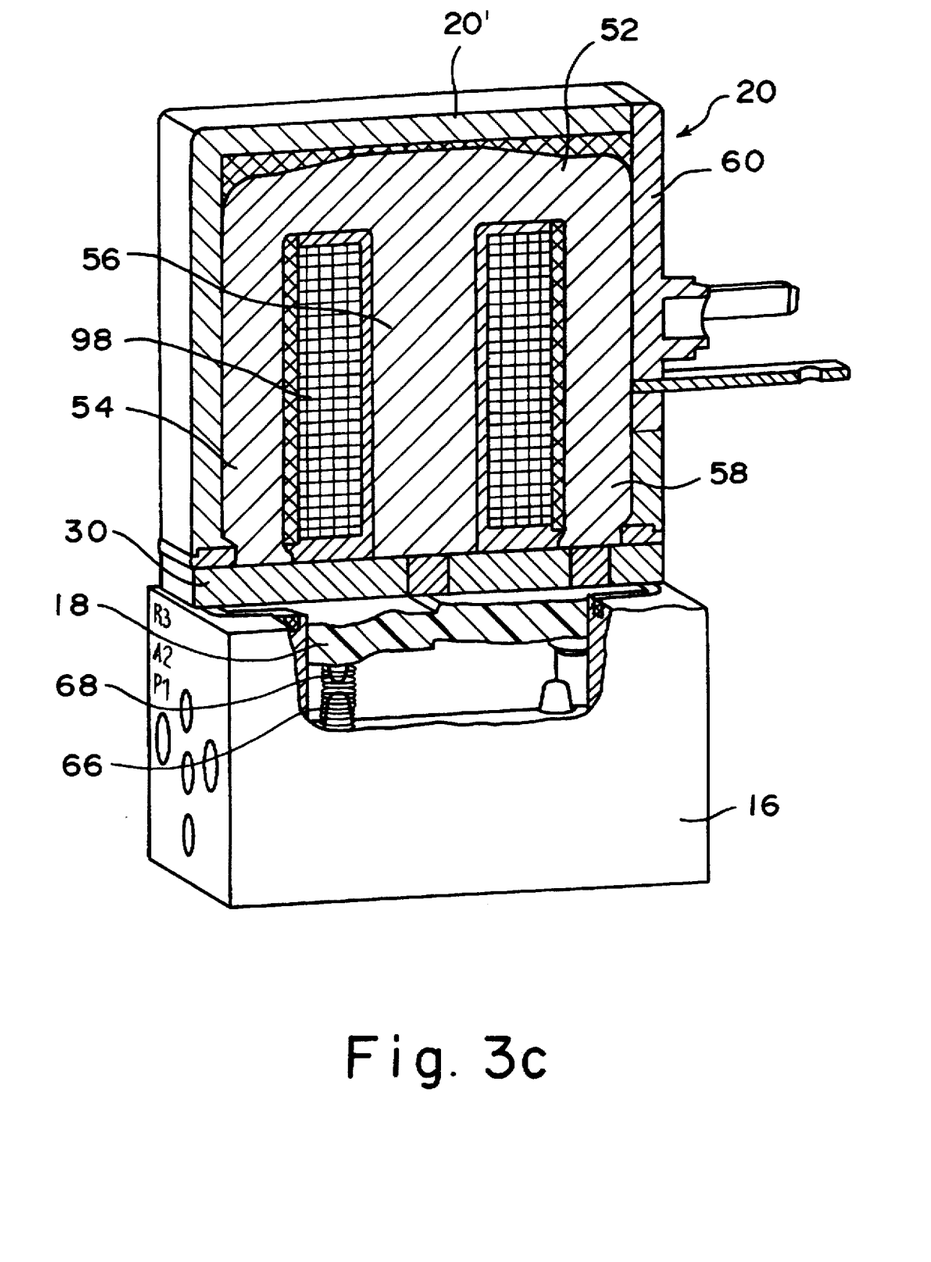

As can be seen from FIGS. 3a, 3b, and 3c, the switching rocker 18 has two return springs 66 associated with it, which in the installed state so act on one of the two switching rocker limbs that the switching rocker 18 is urged into an initial position. Using the electromagnetic valve drive 20 the switching rocker 18 may then be displaced from this initial position into a working position.

Between valve chamber 16 for the respective fluid and the electromagnetic valve drive 20 there is an intermediate plate 30, sealingly shutting off the valve housing 16 on the side facing the electromagnetic valve drive 20.

This intermediate plate 30 is essentially manufactured of a magnetically non-conductive material. It merely possesses two locally limited magnetically conductive regions 32 and 34, through which the electromagnetic valve drive 20 may act on one of the two limbs 36 and 38 (see FIG. 3a) of the switching rocker 18, whereas the other limb, owing to the screening effect of the magnetically non-conductive material, is not able to be acted upon magnetically.

The valve housing 16 and the intermediate plate 30 each possess four attachment holes 84, using which the intermediate plate 30 may for instance be screwed firmly to the valve housing 16. The switching rocker 18, arranged within the closed valve housing 16, is able to be pivoted or rocked by the externally arranged electromagnetic valve drive 20 about the axis 50.

The electrical connection part 60 is laterally slipped over the electromagnetic valve drive 20 or, respectively, the housing 20' thereof. For this purpose the housing 20' possesses a corresponding recess 106.

In accordance with FIG. 2 the electromagnetic valve drive 20 has a three-limbed yoke 52 and furthermore a coil 98 arranged on the center limb 54 thereof, same being received in the housing 20' in the assembled condition. The three limbs 54, 56 and 58 of the yoke 52 are in a single plane, the yoke 52 having a structure which is symmetrical about a plane extending perpendicularly thereto and through the center limb 54. The poles 44 and 48 at the free ends of the outer limbs 56 and 58 accordingly are at the same distance from the center pole 46, which is at the free end of the center limb 54.

The coil 98 is provided at the top end with two connection pins 108, engaging electrical contact means 110 arranged on the electrical connection part 60, such contact means extending into the housing 20 when the electrical connection part 60 is placed in position.

When the valve is assembled the center limb 54 of the yoke 52 is at least generally located in the plane of symmetry perpendicular to the intermediate plate 30 and containing the rocker axis 50.

As shown in FIG. 3a the valve housing 16 comprises a delivery port 10 and a return 14. Both of the ports 10 and 14 open at a valve seat 22 and, respectively, 24 into the valve chamber defined by, and within the valve housing 16.

Figure 5:
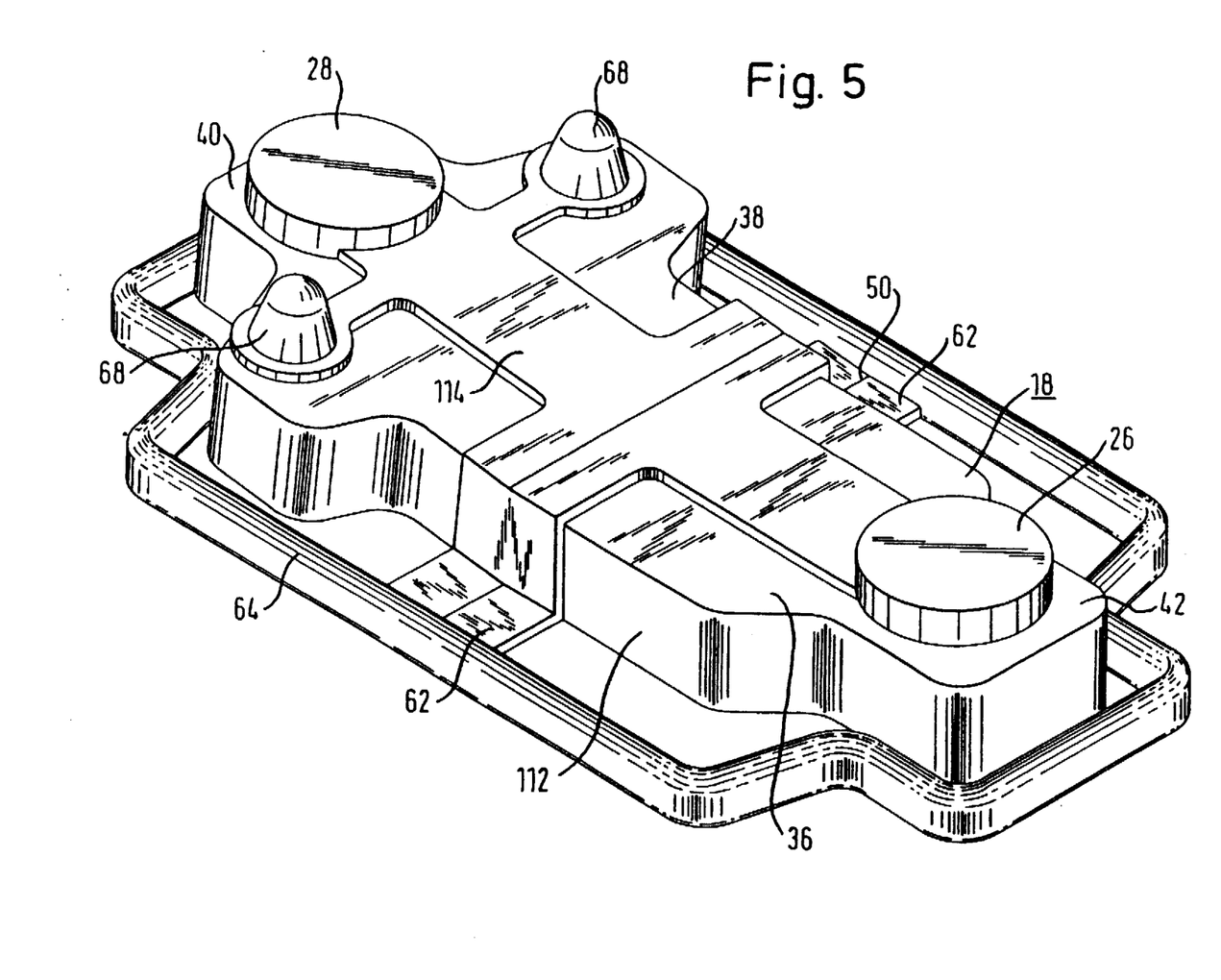
FIG. 5 is a diagrammatic view of the lower side of the switching rocker.

At opposite ends 40 and 42 of the switching rocker 18 a respective valve or closing member 26 and 28 is arranged for cooperation with a respective valve seat 22 and 24 (see also FIG. 5). The valve seats 22 and 24 for the delivery port 10 and the return port 14 are, like the two valve members 26 and 28 of the installed switching rocker 18, in the valve housing 16 arranged symmetrically with respect to the plane perpendicular to the intermediate plate 30 and containing the axis 50 of the rocker.

In the assembled state of the valve the locally limited magnetically conductive region 32 arranged centrally in the intermediate plate 30 is at least generally over the axis 50 of the rocker. Furthermore this central magnetically conductive region 32 is opposite to the central pole 46 present at the free end of the middle yoke limb 54, same being locally limited on this pole 46. Opposite thereto the other magnetically conductive region 34 is arranged opposite the pole 44 or 48, dependent on the relative position of assembly of the intermediate plate and of the magnet, said pole being formed by the free end of the outer yoke limb 56 or, respectively, 58. In this respect the magnetically conductive region aligned with an outer pole 44 and 48 is always also opposite a respective end 40 and 42 of the switching rocker 18.

Beside the two ports 10 and 14 respectively opening at a valve seat 22 and 24 the valve housing 16 is also provided with an intermediately placed, non-controlled power port 12, which like the two other ports 10 and 14 opens into the valve chamber defined by the valve housing 16.

In the installed state depicted in FIG. 3a the valve member 26 is in sealing engagement with the valve seat 22, when the switching rocker 18 is urged by the return springs 66 into the initial position, whereas the valve member 38 provided at the opposite end 40 of the switching rocker 18 is shifted clear of the associated valve seat 24. When the intermediate plate 30 is properly installed the switching rocker 18 can then be shifted out of this initial position by the electromagnetic valve drive 20 into a working position, in which the valve member 28 sealingly engages the valve seat 24 whereas the valve member 28 provided at the opposite end 42 (see FIG. 5 as well) of the switching rocker 18 is moved clear of the associated valve seat 22.

As can be seen FIGS. 3a, 3b, and 3c, in the illustrated valve the valve housing 16, the switching rocker 18 with the associated return springs 66, the intermediate plate 30 and the electromagnetic valve drive 20, with which an electrical connection part 60, also designed in the form of a module, is able to be coupled, are able to be mounted respectively alternatively in two different angular settings spaced apart by 180° with respect to an imaginary axis 96, (see FIG. 2) which is perpendicular to the rocker axis 50, and extends through the center yoke limb 54.

Due to the symmetrical structure of the electromagnet comprising the yoke 52 and furthermore the coil 58, the common center yoke limb 54 and the one outer yoke limb 56 and, respectively, the other outer yoke limb 58 are responsible for the formation of two magnetic circuits, the intermediate plate 30 ensuring that at all times only one of the two magnetic circuits acts on one of the limbs 36 and 38 of the switching rocker 18. As related to the other rocker limb the intermediate plate 30 plays the role of a magnetic screen.

Owing to its symmetrical structure the yoke 52 may be turned about the axis 96 thereof without this affecting the manner of operation of the valve. The manner of operation of the valve may be varied if more particularly the intermediate plate 30 and the switching rocker 18 are fitted in place with associated return springs 66 in a position turned through 180°. In any event the intermediate plate 30 will ensure, in a manner yet to be explained, a sealing separating action between the part of the valve subjected to the fluid and the electromagnetic valve drive 20. This separation renders possible replacement of the drive without switching off the part acted upon by the fluid.

As shown more particularly in FIG. 5, the switching rocker 18 comprises a substantially cruciform rocker body 112, which by the intermediary of lugs 62 is pivotally borne on a frame part made of a sealing material, such frame part simultaneously serving as a housing seal 64, which is able to be inserted between the valve housing 16 and the intermediate plate 30 terminating same.

The lugs or ribs 62 extending along the rocker axis 50 and defining same are components of a duplicate cruciform structure 114, comprising both the two valve members 26 and 28 and also two knobs 68 which guide the return springs 66. Accordingly more particularly the two valve members 26 and 28 as well consist of sealing material. These valve members 26 and 28, together with the two knobs 68 and the structure 114 attached to the rocker body 112, including the lugs 62, are integrally manufactured with the housing seal 64. This annular housing seal 64 is inserted in a groove 92 depicted in FIG. 3, on the top edge of the valve housing 16 which is thereafter to be closed by the intermediate plate 30.

Because of the integral design of the housing seal and of the seat seal a common injection mold can be employed, which in addition to the seal outline for the valve housing comprises the seat seal outline including the structure 114 to be attached on the rocker body 112 including a narrow lug 62 as a connection. Apart from simple assembly and low costs there is in addition optimum damping of the switching rocker 18.

Figure 4:
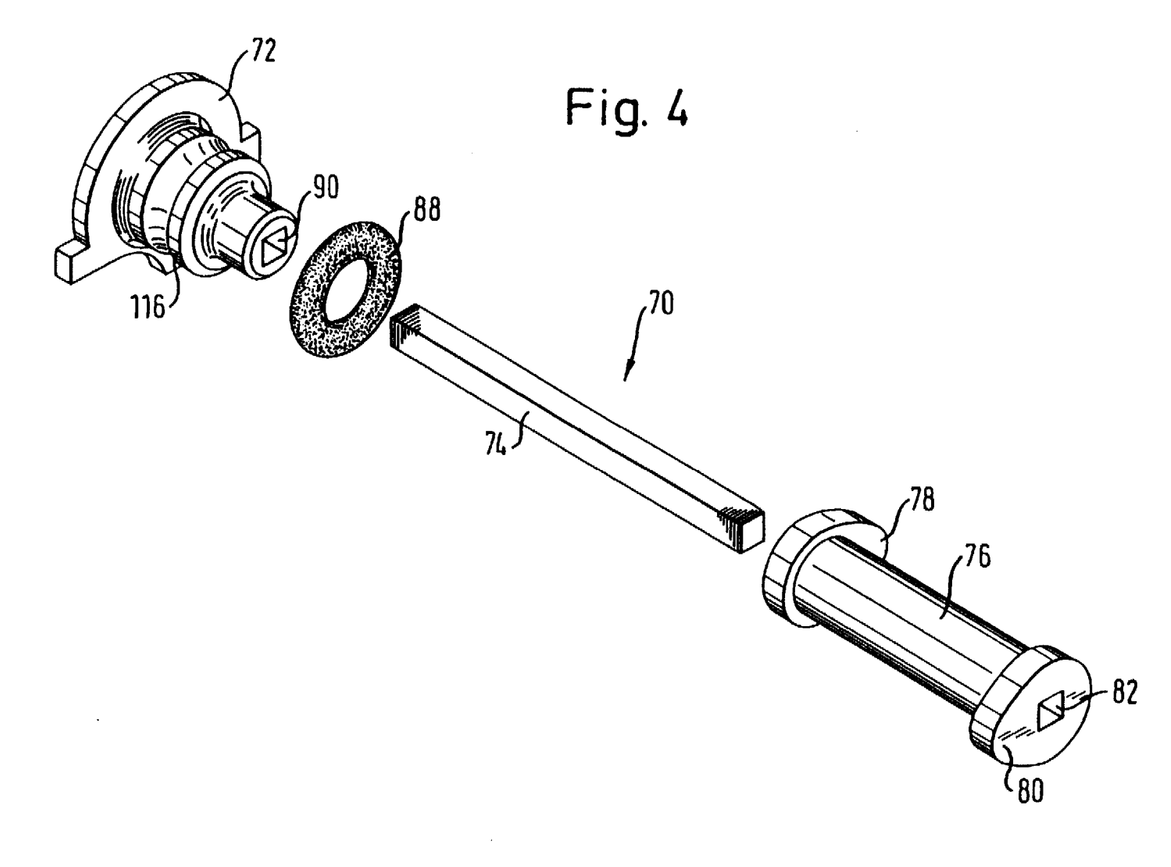
FIG. 4 shows various separate parts of the manual actuating device in an exploded, perspective view.

As more especially shown in FIGS. 3a, 4 and 6, the switching rocker 18 may be provided with an associated manual actuating device 70.

In the illustrated working embodiments such manual actuating device 70 provided underneath the switching rocker 18 and pivotally mounted on the valve housing 16, comprises an actuating element 72 attached on the outer side of the valve housing 16, such element 72 being for example in the form of a tommy bar or a slotted head screw. This actuating element 72 is connected with a cam shaft 76, by the intermediary of a drive shaft 74 extending into the interior of the valve housing 16 perpendicularly to the pivot axis 50 of the switching rocker 18, the cam shaft 76 being attached underneath the switching rocker 18. This cam shaft 76 possesses two cams 78 and 80 extending radially in opposite directions and respectively associated with one of the two rocker limbs 36 and 38.

The cam shaft 76 is a hollow shaft and is able to be slipped axially onto, and drivingly connected with, the drive shaft 74 in either of two alternative settings which are angularly separated by 180° about an imaginary axis perpendicular to the drive shaft 74. For this purpose the drive shaft 74 has a square cross section, while the cam shaft 76 possesses a through opening 82 complementary thereto.

As shown in FIG. 3a the section running between the two outer cams 78 and 80 of the cam shaft 76 bears against two supports 100 and 102 arranged on opposite sides of the non-controlled power port 12. At such support 102 an abutment 104 is also provided opposite to which there is the free end of the drive shaft 74, which is within the valve housing 16.

On the other end of the drive shaft 74 the actuating element 72 is slipped over a stepped cylindrical head, pivotally mounted on an outer head 118, having the form a short tube, of the valve housing 16. The cylindrical head 116 associated with the actuating element 72 comprises, on a free end thereof, an opening 90 (see FIG. 4) which is complementary to the cross sectional configuration of the drive shaft 74. Sealing of the valve housing 16 at the cylindrical head 118 is taken care of using an annular seal 88, adapted to be mounted on the free end, having a correspondingly smaller outer diameter, of the cylindrical head 116.

In the position depicted in FIG. 4 of the manual actuating device 70 the two cams 78 and 80 of the cam shaft 76 extend in a common horizontal plane. In this case there is no actuation of the switching rocker 18 by the actuating device 70.

If now starting from the position illustrated in FIG. 4 the actuating element 72 is turned in the clockwise direction the left cam 78 will be moved into an upright setting with the result that the respective limb 36 of the switching rocker 18 will be actuated, providing same has its associated valve member previously held against the respective valve seat 22. If the actuating element 72 is turned counterclockwise the right cam 80 will be turned upward as is illustrated in FIG. 3a. In this case the right limb 38 of the switching rocker 18 is consequently acted upon and if necessary moved clear of the valve seat 24.

This manual actuating device 70 accordingly renders possible actuation of the switching rocker 18 at either end, something which is more especially an advantage during pulsed operation of the valve, because the valve may then be more particularly reset with the aid of such actuating device.

Because the cam shaft 76 may be slipped onto the drive shaft 74 in either of two angular settings spaced apart by 180°, it is possible for the correlation between actuation of a given rocker limb and a particular direction of turning to be set just as is required.

In addition to this the manner of operation of the valve can be varied by a reversed fitting of the switching rocker and of the intermediate plate without this simultaneously meaning that the manual actuating device must be shifted to the opposite side of the valve. In order to maintain the respective function of such manual actuating device unchanged, all that is required is for the cam shaft to be turned through 180°. This is more particularly an advantage if the manner of operation must be later changed by the user. In accordance with the respective type of installation and the respective direction of turning opening or closing of the valve will be caused. More particularly, further turning through 180° in the opposite direction will then mean resetting to the previously set function.

It will further be understood from FIG. 3a that on the upper edge of the valve housing 16 on two opposite sides there is a respective slot 94 (of which one is shown), into which the lugs 62 may be fitted which provide for pivotal mounting of the switching rocker 18.

In FIG. 6 different possible variations in the assembly of a valve with a modular design of the above type are depicted. More particularly the possibility is indicated of modifying the manner of operation and/or the electrical connection and fluid connection side by having fitting settings which are turned through 180° in relation to a vertical axis, of the electromagnetic valve drive 20 with a mounted electrical connection part 60 and also of the intermediate plate 30 and the switching rocker 18. This purpose is also served by the symmetrical arrangement of the fluid ports of the valve housing 16. Thus the delivery port 10 with the associated valve seat 22 and the return port 14 with the associated valve seat 24 may be changed over just as required in accordance with the specific requirement and the required manner of operation.

Figure 6A:
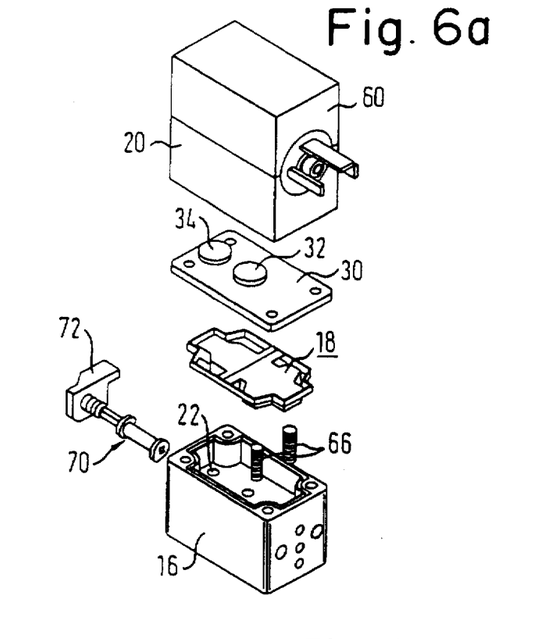
FIGS. 6a to 6d show four different possible assembly-related combinations in a perspective, exploded representation.

In accordance with FIG. 6a the actuating element 72 of the manual actuating device 70 is arranged on the left side of the valve housing 16. The switching rocker 18 is so fitted in the valve housing 16 that the right limb thereof is acted upon by the return springs 66 in order to urge such switching rocker 18 into the initial position. As can be seen from FIGS. 3b and 3c, the return springs 66 may be guided in any conventional manner. Thus, they may be guided by knobs 68 on the switching rocker 18 and by knobs on the lower side of valve housing 16, the latter knobs being seen in FIG. 2 in which the knob for the right hand spring 66 is illustrated as a cylindrical upwardly extending projection.

In this initial position the left limb of the rocker is applied, by the intermediary of the associated valve member, to the valve seat 22 of the delivery port 10. The opposite return port 14 (see also FIG. 3a) is opened.

The intermediate plate 30 is so fitted that the electromagnetic valve drive 20 acts by way of the two locally limited magnetically conductive regions 32 and 34 only on the left rocker limb so that same is able to be moved using the electromagnetic valve drive 20 out of the initial position into a working position, in which the delivery port 10 is open and the return port is closed. For this purpose the electromagnetic valve drive 20 is to be supplied with power via the electrical connection part 60, which is mounted in this design. The electromagnetic valve drive 20 together with the detachably mounted, replaceable electrical connection part 60 is so mounted in the illustrated manner that electrical connection is possible from the right side.

In the power down state of the valve the delivery port 10 is hence closed, whereas the return port 14 is open (see also FIG. 3a). The fluid present at the non-controlled power port 12 can escape via the return port 14.

If the winding of the coil of the electromagnetic drive 20 is supplied with power using the electrical connection 60, then at the left rocker limb extending over the magnetically conductive regions 32 and 34 of the intermediate plate 30 a magnetic field will be produced, such field causing the left rocker limb to be lifted in order to open the delivery port and to close the return port. The fluid will now be propelled to the power port 12. The right rocker limb is not magnetically actuated, since the action of the right yoke limb of the symmetrically designed electromagnet is overridden through the magnetically non-conductive part of the intermediate plate 30.

Figure 6B:
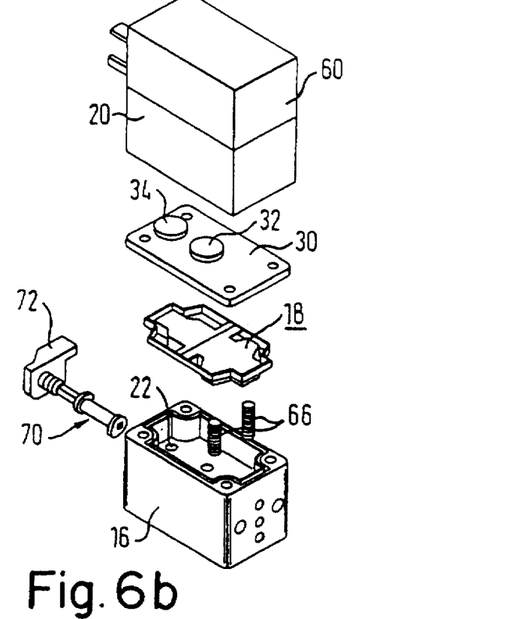

The modified form of assembly of the valve illustrated in FIG. 6b differs from that of FIG. 6a in that the electromagnetic valve drive 20 including the electrical connection part 60 mounted thereon, is turned through 180° about the vertical axis. This now means that the electrical connection side is on the left. Owing to the symmetrical design of the electromagnet comprised in the electromagnetic valve drive 20 the manner of the operation of the valve is not as a result changed. As a consequence of the unchanged position of the fitting of the intermediate plate 30 it is still ensured that only the left rocker limb is magnetically acted upon. Additional measures for adaptation of the valve to this mode of use are accordingly not required.

Figure 6C:
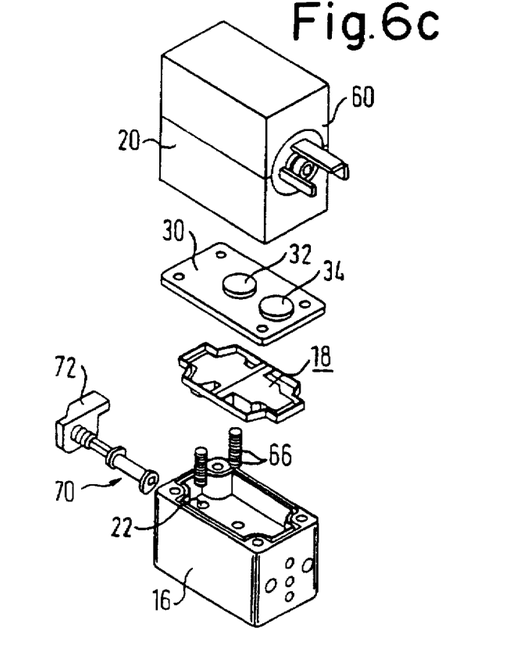

The modified form illustrated in FIG. 6c of possible assembly of the valve is different to that of FIG. 6a in that the intermediate plate 30 and the switching rocker 18 with associated return springs 66 are now turned through 180° around the vertical axis. In this case the switching rocker 18 is urged by the return springs 66 into an initial position, in which the delivery port is opened and the return port is closed. The valve is accordingly opened in the power down state of the electromagnetic valve drive 20. The intermediate plate 30, also turned through 180°, ensures that now the right rocker limb can be acted upon by the electromagnetic valve drive 20, whereas magnetic action on the left rocker limb is out of the question, since the action of the left yoke limb or, respectively, of the pole at its free end is overridden by the magnetically non-conductive part of the intermediate plate 30.

As soon as the coil of the electromagnetic drive 20 is supplied with power via the electrical connection part 60 mounted on it, the right rocker limb is attracted and lifted clear of the valve seat 24 (see also FIG. 3a) associated with return port 14. Accordingly this return port 14 will be opened and the delivery port 10 closed.

Figure 6D:
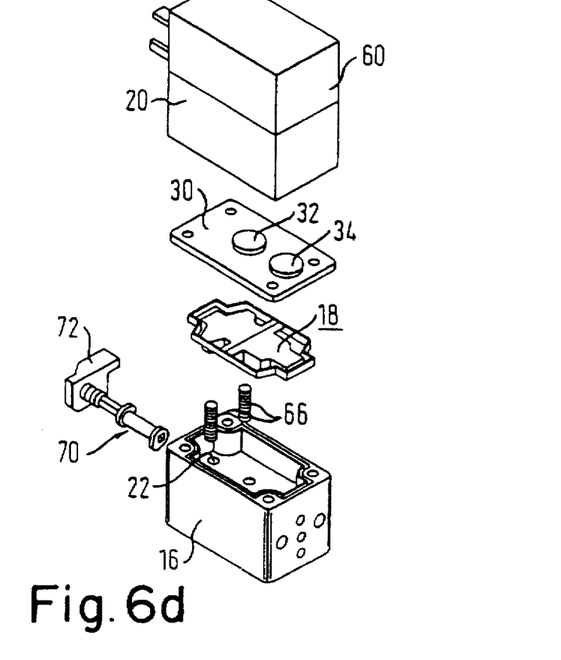

The modified form illustrated in FIG. 6d of possible assembly of the valve is different to that of FIG. 6c in that, with the electrical connection part 60 fitted, the electromagnetic drive 20 is turned about the vertical axis through 180°. Accordingly the electrical connection side is again shifted from the right to the left. Due to the symmetrical structure of the electromagnet of the valve drive 20 the manner of operation of the design depicted in FIG. 6c is adhered to. In the power down state of the electromagnetic valve drive 20 the valve is hence opened. As soon as the coil of the electromagnetic valve drive 20 is supplied with power, the switching rocker 18 will be pivoted accordingly to close the valve.

The respectively necessary return force acting on the switching rocker is dependent, inter alia, on the pressure to be sealed off and the manner of operation of the valve. In the power down closed state of the valve and with access of flow to the respective seat seal from below, the return force must be such that it thrusts the seal on the seat against the applied pressure. In the power down open state of the valve and with access of flow to the respective seat seal from above, the pressure across the seal will reinforce the sealing action so that the return force will not have to be equal to the higher value of the power down, closed condition of the valve.

Figure 7:
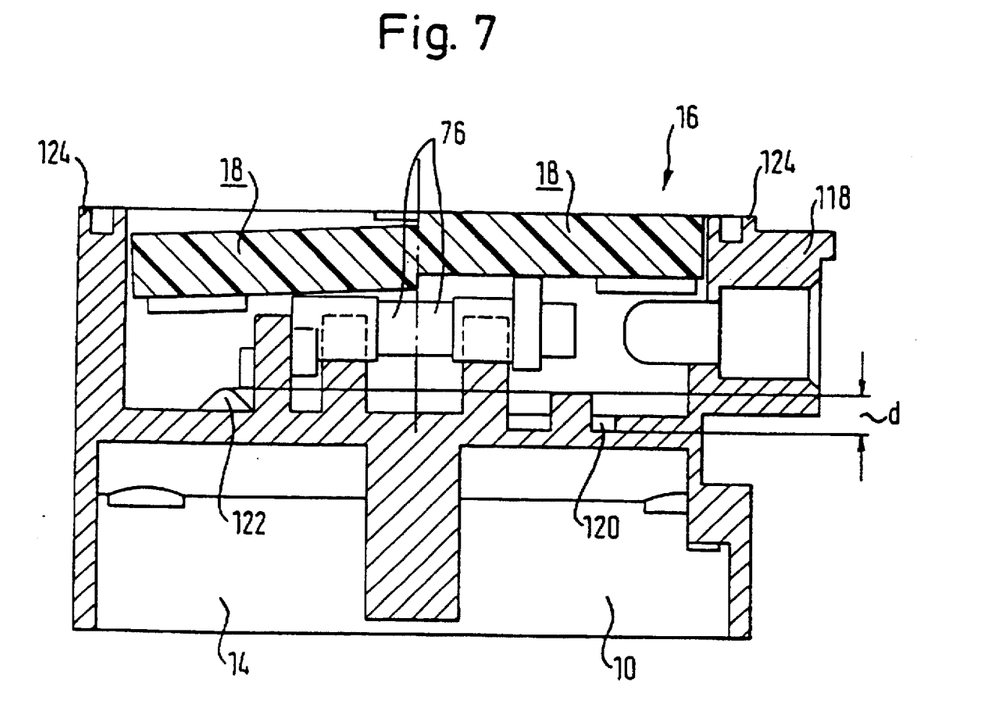
FIG. 7 shows a simplified, diagrammatic sectional view, similar to FIG. 3, of the valve housing using a staggered plane of section in order to indicate spring receiving means at different depths.

In order nevertheless to be able to utilize identical return springs 66 (see FIGS. 1, 2 and 6), in the design of FIG. 7 the spring receiving means 120 provided on the side of the delivery port 10 are, as viewed from the housing edge 124 adjacent to the switching rocker 18, deeper down in the valve housing 16 than the spring receiving means 122 provided on the opposite side of the return port 14.

The spring receiving means 120 and 122, against which the return springs 66 (not illustrated in FIG. 7) bear, are at such a depth in the valve housing 16 and so adapted to the different modes of operation that the spring stroke in the power down, opened state of the valve, is longer by the amount d than the spring stroke in the case of the power down closed state of the valve. Despite the use of identical return springs 66 there is thus the provision of different return forces with an optimum adaptation to the respective modes of operation.

The advantage of this modification of the invention is to be seen in economy as regards additional springs.

We claim:

1. A modular valve comprising a valve housing with a plurality of fluid ports and a switching rocker, said switching rocker having two limbs with opposite ends and a pivot axis, said switching rocker further being arranged and pivotally mounted within said valve housing, a closure member being provided at each of said opposite ends of the switching rocker, the valve further comprising spring means which urge said switching rocker into an initial position and an electromagnetic valve drive adapted to be fitted to said valve housing in a position opposite to said switching rocker, said valve drive having magnetic poles for attracting and moving said switching rocker into an operative position against the force of said spring means, a valve seat where one of said fluid ports opens and against which said closure member may be applied, a generally magnetic non-conductive intermediate plate being arranged between said valve housing and said electromagnetic valve drive and having locally limited magnetically conductive regions through which said electromagnetic valve drive acts on one of said limbs while the other of said limbs is not able to be acted upon magnetically, said closure members and said magnetic poles being symmetrically arranged with respect to a plane of symmetry perpendicular to said intermediate plate and containing said pivot axis in the assembly state of the valve; and said valve housing, said switching rocker with said spring means and said intermediate plate being mounted alternatively in two orientations angularly spaced from each other by 180° about an imaginary axis which is perpendicular to said pivot axis and contained in said plane of symmetry.

2. A modular valve comprising a valve housing with a plurality of fluid ports and a switching rocker, said switching rocker having two limbs with opposite ends and a pivot axis, said switching rocker further being arranged and pivotally mounted within said valve housing, a closure member being provided at each of said opposite ends of the switching rocker, the valve further comprising spring means which urge said switching rocker into an initial position and an electromagnetic valve drive adapted to be fitted to said valve housing in a position opposite to said switching rocker, said valve drive having magnetic poles for attracting and moving said switching rocker into an operative position against the force of said spring means, a valve seat where one of said fluid ports opens and against which said closure member may be applied, a generally magnetic non-conductive intermediate plate being arranged between said valve housing and said electromagnetic valve drive and having locally limited magnetically conductive regions through which said electromagnetic valve drive acts on one of said limbs while the other of said limbs is not able to be acted upon magnetically, said closure members and said magnetic poles being symmetrically arranged with respect to a plane of symmetry perpendicular to said intermediate plate and containing said pivot axis in the assembled state of the valve; and said valve housing, said switching rocker with said associated spring means and said electromagnetic valve drive being coupled with an electrical connection part, being mounted alternatively in two orientations angularly spaced from each other by 180° about an imaginary axis which is perpendicular to said pivot axis and contained in said plane of symmetry.

3. The valve as claimed in claim 2, wherein said intermediate plate is also mountable alternatively in two orientations angularly spaced from each other by 180° about an imaginary axis which is perpendicular to said pivot axis in said plane of symmetry.

4. The valve as claimed in claims 1, 2, or 3 wherein said electromagnetic valve drive comprises a three limb yoke and, furthermore, a coil arranged on a center limb thereof, each of said limbs having a free end.

5. The valve as claimed in claims 1, 2 or 3 characterized in that the valve housing (16) is terminated on the side facing the electromagnetic valve drive (20) by the intermediate plate (30).

6. The valve as claimed in claim 1, 2, or 3, characterized in that on either side of the plane containing the pivot axis (50) and perpendicular to the intermediate plate (30), in each case at least one valve seat (22, 24) is provided and the valve seats (22, 24) are arranged symmetrically in the valve housing (16) as related to this plane.

7. The valve as claimed in claim 4, characterized in that in the assembled state of the valve, the center yoke limb (54) is at least substantially in the plane of symmetry which is perpendicular to the intermediate plate (30) and containing the pivot axis (50).

8. The valve as claimed in claim 4, characterized in that the intermediate plate (30) comprises two locally limited magnetically conductive regions (32, 34), of which one (32) is arranged in the center of such plate and is opposite to the free end of the center yoke limb (54), whereas the other (34) is opposite to the free end of one of the two outer yoke limbs (56, 58).

9. The valve as claimed in claim 4, characterized in that the free ends, constituting the respectively outer pole (44, 48), of the two outer yoke limbs (56, 58) are at the same distance from the free end, constituting a center pole (46), of the center yoke limb (54).

10. The valve as claimed in claims 1, 2 or 3, characterized in that the valve housing (16) comprises a delivery port (10) and a return port (14), which respectively open at a valve seat (22, 24), to which a valve member (26, 28) provided at one and, respectively, the other end (40, 42) of the switching rocker (18), can be applied, and in that the valve housing (16) furthermore possesses a non-controlled power port (12).

11. The valve as claimed in claims 1, 2 or 3, characterized in that a spring loading means is provided for holding the switching rocker and with the switching rocker (18) held by the spring loading means (66) in its initial position, a valve member (26, 28) provided on one end (40, 42) of the switching rocker engages an associated valve seat (22, 24), whereas, with the switching rocker (18) moved by the electromagnetic valve drive (20) into its working position, a valve member (28, 26) provided on the other end (42, 40) of the rocker engages another valve seat (24, 22).

12. The valve as claimed in claims 1, 2 or 3, characterized in that the electrical connection part (60) is adapted to be fitted to the electromagnetic valve drive (20) in a detachable fashion.

13. The valve as claimed in claims 1, 2 or 3, characterized in that the switching rocker (18) is pivotally mounted by the intermediary of elastic lugs (62), extending along the pivot axis (50) thereof, on a frame part manufactured of sealing material, such frame part being able to be inserted as a housing seal (64) between the valve housing (16) and the intermediate plate (30) terminating same, and in that the valve members (26, 28) provided on the switching rocker (18) are also manufactured of sealing material, said housing seal (64) being formed integrally with the lugs (62) and the valve members (26, 28).

14. The valve as claimed in claims 1, 2 or 3, characterized in that the switching rocker (18) is urged by return springs (66) into an initial position thereof, which springs preferably run on knobs (68) provided on the switching rocker (18).

15. The valve as claimed in claim 13, characterized in that the knobs (68) are formed integrally with the valve members (26, 28), the lugs (62) and the housing seal (64).

16. The valve as claimed in claims 1, 2 or 3, characterized in that the switching rocker (18) has a manual actuating device (70) associated with it.

17. The valve as claimed in claim 16, characterized in that the manual actuating device (70) comprises an actuating element (72) arranged on one outer side of the valve housing (16) and being connected, via a drive shaft (74) extending into the interior of the valve housing (16) perpendicularly to the axis (50) of the pivoting of the switching rocker (18), with a cam shaft (76), which is provided with two cams (78, 80) extending radially in opposite directions and being associated with one of the two limbs (36, 38) of the switching rocker.

18. The valve as claimed in claim 17, characterized in that the cam shaft (76) is a hollow shaft and may be slipped axially over, and drivingly connected with, the drive shaft (74) in either of two alternative settings which are angularly spaced apart by 180° around an imaginary axis which is perpendicular to the drive shaft (74).

19. The valve as claimed in claim 18, characterized in that the drive shaft (74) has at least partially the cross sectional configuration of a polygon and the cam shaft (76) is provided with a complementary opening (82).

20. The valve as claimed in claim 12, characterized in that the actuating element (72) is a tommy bar.

21. The valve as claimed in claim 12, characterized in that the actuating element (72) is a slotted screw.

22. The valve as claimed in claims 1, 2 or 3, characterized in that on the delivery port side and, respectively, on the return port side at least one spring receiving means (120, 122) is provided in the valve housing (16), in that the switching rocker (18) has at least one associated return spring (66), able to be employed alternatively on the two connection sides, such return spring bearing, for a respective action on the switching rocker (18), on a respective spring receiving means (120, 122), and in that the spring receiving means (120, 122) provided on the different connection sides have different depths in the valve housing (16) as seen from the housing edge (124) adjacent to the switching rocker (18).

23. The valve as claimed in claim 1, 2 or 3, characterized in that the spring receiving means (120) on the delivery port side extends more deeply in the valve housing (16) than the return port side spring receiving means (122).

* * * * *